United States Patent [19]

Powers

[11] 4,021,050
[45] May 3, 1977

[54] AIR BEARING SEAL WITH BELLOWS MOUNTING MEANS

[75] Inventor: Harold C. Powers, Peoria, Ill.

[73] Assignee: Caterpillar Tractor Co., Peoria, Ill.

[22] Filed: Feb. 23, 1976

[21] Appl. No.: 660,524

[52] U.S. Cl. ................................................ 277/75
[51] Int. Cl.² .......................................... F16J 15/40
[58] Field of Search ................................. 277/70–76

[56] References Cited

UNITED STATES PATENTS

| 3,572,726 | 3/1971 | Bottoms | 277/74 |
|---|---|---|---|
| 3,572,727 | 3/1971 | Greiner | 277/74 |
| 3,815,926 | 6/1974 | Vore | 277/74 |
| 3,887,199 | 6/1975 | Sundquist | 277/74 |

Primary Examiner—Robert I. Smith
Attorney, Agent, or Firm—Phillips, Moore, Weissenberger, Lempio & Majestic

[57] ABSTRACT

An air bearing is coaxially mounted around a rotatable shaft, such as an engine crankshaft, by means of a flexible boot having walls forming a chamber therebetween. The bearing includes a pair of flexible lip seals thereon which contact the shaft at low speeds or when the shaft rotation is stopped and thereby effects sealing. The boot chamber is adapted to be pressurized by air to lift the seals out of contact with the shaft. In this manner, continuous streams of air will flow past the seals to prevent oil or contaminants from moving in a direction opposite to the air flow direction. The bellows arrangement, integral with the lip seal assemblies, enables the seal to be moved in a radially outward direction to accommodate lateral shaft movement. An alternate embodiment eliminates the lip seals and produces a dynamic seal which compensates for temperature differential affects and makes the air bearing clearance with the shaft self-compensating.

18 Claims, 8 Drawing Figures

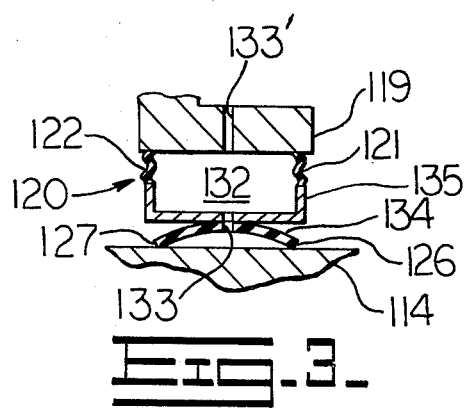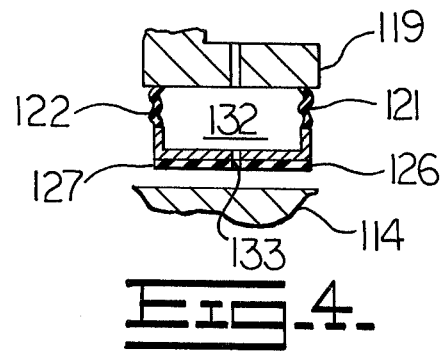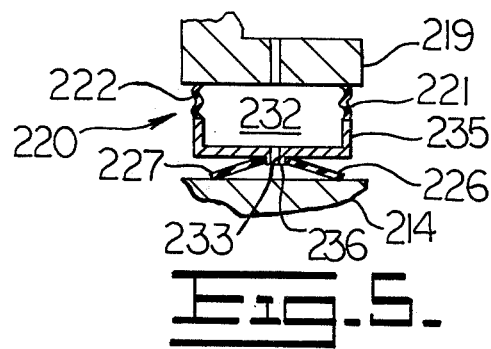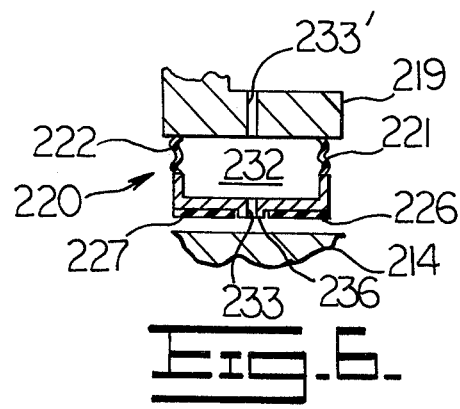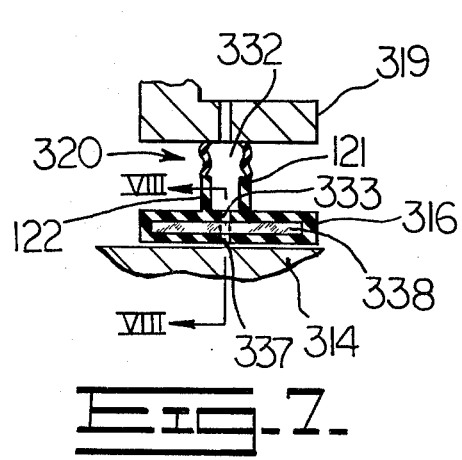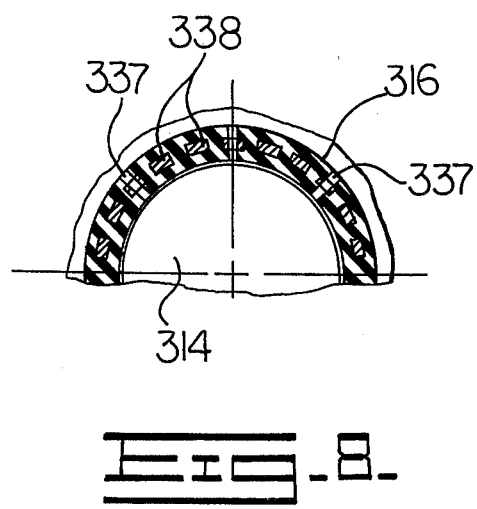

AIR BEARING SEAL WITH BELLOWS MOUNTING MEANS

BACKGROUND OF THE INVENTION

This invention relates to seal assemblies of the type including air flow past the seals to prevent oil or contaminants from moving in a direction opposite to such air flow. In particular, this invention relates to an improved lip seal which includes a bellows or flexible boot portion enabling movement of the seal in a radially outward direction.

Internal combustion engines require efficient seals at the ends of the crankshaft. These sealing means, in the form of circumscribing seals, perform several functions. First, they retain oil or other lubricant in the engine's crankcase. Secondly, they prevent contaminants from entering the engine from the surrounding environment. Such contaminants can, of course, result in shortened engine life.

One type of seal that has been found to be effective in this environment is that shown in U.S. Pat. No. 3,575,426 assigned to the assignee hereof. With this patent device, a pair of lip seal assemblies are coaxially mounted around a rotational shaft to form a chamber therebetween adapted to be pressurized by air which lifts the seal out of contact with the shaft. In this manner, continuous streams of air will flow past the seals to prevent oil or contaminants from moving in a direction opposite to such air flow. In addition, seal life is enhanced because seals do not normally run against the surface of the shaft. However, when the shaft is at rest the seal is forced to positively contact the shaft by means of retainer springs located radially outwardly of the lip. However, the subject seal tends to be rather stiff and lacks the flexibility desired. This results in some control problems being engendered in the selection of the amount of air flow necessary to lift the lip from the shaft surface.

The lip-type seal thus described commonly has a service life of up to 4,000 hours, but is limited to about 4,500 ft/min. surface speeds and 250° F oil sump temperatures. In addition, failure rates are high, primarily due to wear and installation problems.

SUMMARY AND OBJECTS OF THE INVENTION

The primary object of this invention is to overcome the thus described and other problems. The solution takes the form of a pressurized sealing arragement comprising a seal assembly including a bearing having a pair of flexible lip seals thereon mounted about the shaft and having flexible lips normally contacting the shaft at low speeds or when shaft rotation is stopped. The bearing is mounted by means of a flexible boot having walls forming a chamber therebetween. The boot permits the bearing to be moved in a radially outward direction away from the shaft surface. The air flow through the chamber and through the bearing and onto the shaft surface permits the bearing to "float". In addition, the air flow lifts the lip seals out of contact with the shaft. Continuous streams of air thus flow past the seals to prevent retrograde movement of oil or other contaminants.

The bellows-like flexible boot enables the bearing to accommodate lateral shaft movements. Due to the fact that the seal does not contact the shaft while the engine is running and the fact that the air flow also serves to cool the lip seals, speeds in excess of 5,000 ft/min. and a sump temperature greater than 250° F can be accommodated. Greatly enhanced seal life is also projected.

In an alternate embodiment, the lip seals are eliminated and the bearing includes means whereby temperature differential effects are compensated for to maintain clearance between the bearing interior and the shaft.

Other objects and advantages of this invention will become more readily apparent from the following description and accompanying drawings.

BRIEF DESCRIPTION OF THE DRAWINGS

FIG. 3 is a cross-sectional view of an alternate embodiment of the seal assembly of FIG. 1;

FIG. 4 is a view of the same with the seal assembly pressurized with air;

FIG. 5 is a cross-sectional view of a second alternate embodiment of the seal assembly of FIG. 1;

FIG. 6 is a view of the same with the seal assembly pressurized with air;

FIG. 7 is a cross-sectional view of still another alternate embodiment of the seal assembly of FIG. 1; and FIG. 8 is a cross-sectional elevation view of the same taken along lines 8—8 of FIG. 7.

DETAILED DESCRIPTION

Figure 1:
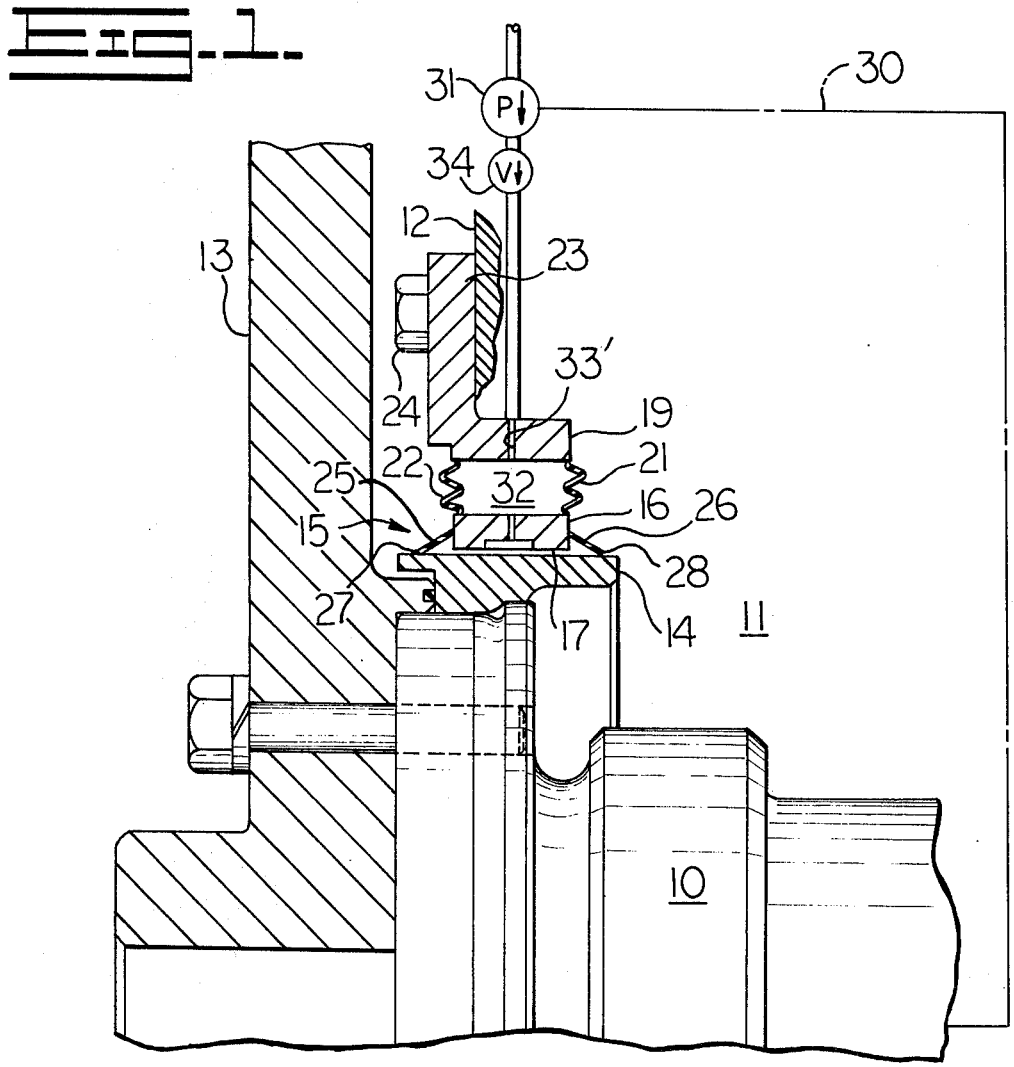
FIG. 1 is a cross-sectional view of the pressurized sealing arrangement of this invention in an engine.
Figure 2:
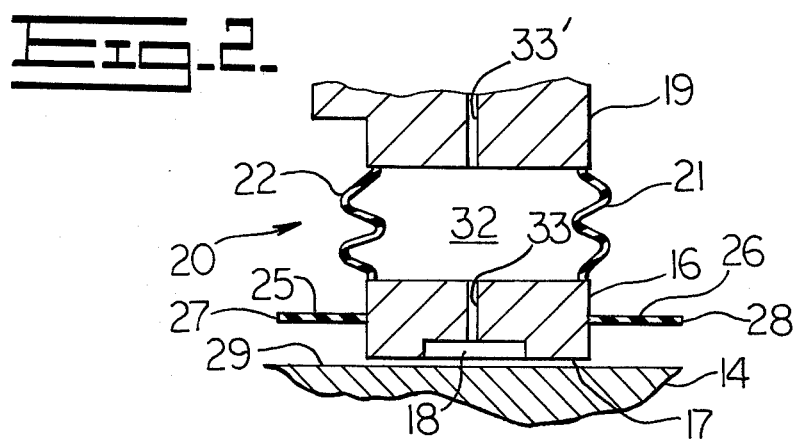
FIG. 2 is an enlarged cross-sectional view of the seal assembly of FIG. 1 with the seal assembly pressurized with air.

FIGS. 1 and 2 of the drawing show a cross-sectional view of the pressurized sealing arrangement of this invention employed in combination with a rotary crankshaft of an internal combustion engine. Although the sealing arrangement of this invention is hereinafter described in such a combination, it should be understood that the sealing arrangement could be used in other suitable applications involving rotary shafts.

Turning now to FIG. 1, there is shown a crankshaft 10 suitably mounted for rotation in an internal combustion engine in a conventional manner. A closed crankcase oil or lubricant retaining chamber, partially shown at 11, is arranged to lubricate the crankshaft support bearing and the pertinent structures. A housing 12 aids in defining the subject crankcase. A flywheel 13 may be press-fitted or otherwise suitably secured onto one end of the crankshaft along with a cylindrical collar 14.

A seal assembly shown generally at 15 is coaxially mounted between the crankshaft and the housing to seal chamber 11 and to prevent ambient contaminants such as dirt or other material from passing into the engine's interior space. As best seen in FIG. 2, a generally ring-shaped bearing 16 of metal material circumscribes the shaft and collar. The bearing has an internal running surface 17 which is spaced from the surface of collar 14 by a gap or clearance as shown. A low friction coating, such as Teflon, may be applied to the surface to inhibit friction when the bearing contacts the shaft. The bearing includes a ring-shaped annulus 18 centered on the running surface for air distribution as will be more fully described hereinafter. Alternatively, pockets or counterbores may be formed on the surface in lieu of the ringshaped annulus. Still further, the surface may be absent any discontinuities for air distribution.

Bearing 16 is flexibly mounted onto a mounting block or baffle 19 by means of a "boot" 20 which may conveniently be made of rubber material. The boot is formed by a pair of corrugated, bellows-like side walls 21, 22. The boot may be fixed to the bearing and mounting block by bonding.

As best seen in FIG. 1, mounting block 19 has a vertical projection 23 which enables it to be mounted onto housing 12 by mounting means, such as bolt 24. The bearing also includes a pair of lip seals 25, 26, which are mounted on the bearing 16 at an angle to the generally radially directed side walls as shown. The seals may be of flexible material, such as rubber, and are generally ring-shaped with their free edges 27, 28 adapted to contact the collar running surface 29 when the shaft is not rotating and the air flow is turned off, as will be more fully described hereinafter.

In operation, and with motive means 30 such as an engine operating to rotate crankshaft 10, pump 31 will be actuated automatically to communicate a pressurized fluid such as air into a chamber 32 formed in boot 20 by way of passage 33 in mounting block 19. It should be understood that the pressure used will vary depending upon a number of design parameters such as the bearing loading of bearing clearance, and size and number of orifices.

The air pressure may be constantly regulated by a valve 34 to maintain a predetermined and substantially constant pressure level in chamber 32. The flow of air will pass from chamber 32 through a plurality of openings, one of which is shown at 33, which lead into annulus 18. As seen in FIG. 2, such pressure will function to raise lip or edge 28 of inward seal 26 out of contact with the surface 29 to form an opening to discharge a steady stream of air into chamber 11. Thus, retrograde movement of lubricating oil out of the crankcase is prevented by the inward seal. In a similar manner, the lip or edge 27 of the outward seal will lift out of contact with surface 29 to discharge a steady stream of air to ambient to prevent contaminants from moving into the crankshaft.

Turning now to FIGS. 3 and 4, there is shown a first embodiment of the instant invention wherein in this and the following embodiments the structure having an analogous counterpart in the first embodiment will be preceded with an increasing integer number. As shown in FIG. 3, the bearing of the first embodiment is eliminated and a flexible ring-shaped arcuate seal 134 having lip portions 126, 127 is fixed to the shaft side of a generally ring-shaped shell 135. A boot 120 has bellows-like side walls 121, 122. A passage 133 extending through the shell and sealing lip permits flow of air from chamber 132 to the bearing surface. As seen in FIG. 4, when the shaft is rotating and air flow is maintained the static sealing lip assumes a position wherein the lips 126, 127 are radially spaced from collar 114 leaving a gap or clearance therebetween. The static sealing lip assumes a position substantially parallel to the shaft or collar surface. The sealing lip may be conveniently affixed to the shell by bonding or other similar means.

Turning to FIGS. 5 and 6, there is shown a second embodiment which is like the first embodiment in all respects except for the following. With this embodiment the static sealing lip is in two parts, 226, 227, separated by an annular ring-shaped projection 236 depending from the underside of the shell 235. As with the second embodiment, the seals 226, 227 attain a position substantially parallel to the shaft or collar when the shaft is rotating and air flow is in operation as best seen in FIG. 6.

The advantage with the embodiments of FIGS. 3 through 6 is in the area of axial length of the seal. With most shaft seal applications axial length is very important. The design shown reduces the axial length requirements for the seals.

Turning to FIGS. 7 and 8, there is shown a third embodiment of the invention which is like the previous embodiments in having a flexible boot 320 attached to a mounting block 319. Depending from the boot is a ring-shaped bearing member connected to chamber 332 within the boot 320 by a passage 333. A plurality of passages 337 centered in the running face with the interior of the bearing 316 allows air to communicate with the shaft or collar surface 314.

Due to the fact that air flow requirements for air bearings vary as the cube of the clearance distance, very close tolerances to control flow are required. In addition, if the air bearing shell coefficient of thermal expansion is different from the shaft on which it runs, the clearance for any given set-up varies with the temperature.

The subject embodiment bearing overcomes this by being self-compensating. Bearing 316 is of elastomeric material which is shaped controlled by means of a plurality of equally spaced axially-directed stiffeners 338 of metal material molded therein, as best seen in FIG. 8. The stiffeners, which are oriented in a direction parallel to the shaft axis, may be thought of as a segmented ring. It may be noted that the side walls of the flexible boot are affixed to bearing 316 adjacent the center portion thereof so that the opposite ends of the bearing are essentially free. By controlling the pressure applied to chamber 332, the clearance of the bearing is automatically adjusted.

It is to be understood that the foregoing description is merely illustrative of the preferred embodiment of the invention and that the scope of the invention is not to be limited thereto, but is to be determined by the scope of the appended claims.

I claim:

1. A pressurized sealing arrangement comprising a rotatable shaft, a generally ring shaped bearing member of rigid material positioned about said shaft, said bearing defining an inner surface and having at least one opening therein on said inner surface thereof and wherein said inner surface is spaced from said shaft, said bearing member further defining a pair of rigid, radially directed side walls, and further including thereon lip seal means of flexible material normally contacting said shaft and movable under air flow into non-contacting relation with said shaft, a flexible boot mounting means fixed to said generally ring-shaped member and having a pair of side walls of flexible material defining an air chamber therebetween, and means for supplying pressurized air to said chamber through said at least one opening and along said shaft to lift said lip seal means out of contact with said shaft and thereby to continuously prevent retrograde movement of contaminants.

2. The invention of claim 1 wherein said bearing further includes an annular groove therein leading to said at least one opening for air distribution.

3. The invention of claim 1 wherein said bearing includes a counterbore corresponding with each said opening for air distribution.

4. The invention of claim 1 wherein said side walls are of corrugated bellows shape.

5. The invention of claim 4 wherein said side walls are of rubber material.

6. The invention of claim 1 wherein said flexible boot mounting means is attached to a mounting member having a passage therein communicating with said chamber.

7. The invention of claim 1 wherein said ring-shaped bearing member comprises a shell and wherein said lip seal means comprise at least one flexible, generally ring-shaped seal attached thereto.

8. The invention of claim 7 wherein the number of seals is two, and wherein each said seal is mounted so that in its normal state an edge or lip portion contacts said shaft.

9. The invention of claim 8 wherein said bearing includes a ring-shaped projection on the inner surface of said bearing serving to separate said seals.

10. The invention of claim 8 wherein said bearing defines a pair of opposite, radially directed side walls and wherein one of said seals is mounted on each of said side walls.

11. A pressurized sealing arrangement comprising a rotatable shaft, a generally ring-shaped bearing member positioned about said shaft, said bearing member defining an inner surface and having at least one opening therein on said inner surface thereof and wherein said inner surface is spaced from said shaft, said generally ring-shaped bearing member including a plurality of elongated stiffening ribs of rigid material therein, and a flexible boot mounting means fixed to said generally ring-shaped member and having a pair of side walls of flexible material defining an air chamber therebetween, and means for supplying pressurized air to said chamber so that air flows from said chamber through said at least one opening.

12. The invention of claim 11 wherein said ribs are or metal material and said ring-shaped member is of resilient material.

13. The invention of claim 11 wherein said ribs are oriented around said ring-shaped member in a direction normally parallel to the shaft axis.

14. The invention of claim 13 wherein said ribs are in equally spaced, parallel relation.

15. The invention of claim 11 wherein said side walls are fixed to said bearing member adjacent the center portion thereof so that the opposite ends of said bearing member are essentially free.

16. The invention of claim 11 wherein said side walls are of corrugated bellows shape.

17. The invention of claim 11 wherein said side walls are of rubber material.

18. The invention of claim 11 wherein said flexible boot mounting means is attached to a mounting member having a passage therethrough communicating with said chamber.

* * * * *